United States Patent [19]
Shelton

[11] Patent Number: 5,884,428
[45] Date of Patent: Mar. 23, 1999

[54] FISHING HOOK APPARATUS FOR CATCH AND RELEASE FISHING

[76] Inventor: Billy R. Shelton, 5279 Salisbury Dr., Newark, Calif. 94560

[21] Appl. No.: 858,794

[22] Filed: May 19, 1997

Related U.S. Application Data

[60] Provisional application No. 60/019,045 May 20, 1996.
[51] Int. Cl.⁶ ..................................................... A01K 83/00
[52] U.S. Cl. ........................... 43/4.5; 43/43.16; 43/43.83
[58] Field of Search ................................... 43/4.5, 43.16, 43/43.83

[56] References Cited

U.S. PATENT DOCUMENTS

| | | | |
|---|---|---|---|
| 2,815,603 | 12/1957 | Bandemer | 43/43.16 |
| 2,979,852 | 4/1961 | Schinke | 43/43.16 |
| 2,984,041 | 5/1961 | Banker | 43/43.16 |
| 3,397,477 | 8/1968 | Hand | 43/15 |
| 3,648,399 | 3/1972 | Lloyd | 43/43.12 |
| 3,827,174 | 8/1974 | Banker | 43/43.16 |
| 4,118,883 | 10/1978 | Watkins | 43/43.16 |
| 4,841,666 | 6/1989 | Dallas | 43/43.16 |
| 4,848,018 | 7/1989 | Clarke | 43/43.12 |
| 4,987,695 | 1/1991 | Preiser | 43/43.16 |
| 5,090,151 | 2/1992 | Salminen | 43/42.05 |
| 5,138,790 | 8/1992 | McManus | 43/44.83 |

*Primary Examiner*—Jack W. Lavinder
*Attorney, Agent, or Firm*—Carol D. Titus; James J. Leary

[57] ABSTRACT

A self releasing hook is designed to work with a sliding sleeve that holds the hook in the straight position while fishing. These hooks have a straight. The eye of the hook is located on the outer edge of the hook at approximately the middle of the arcuate section. The hook in combination with the sliding sleeve complete the self releasing rig. After the angler catches the fish, the fish is removed by pulling the custom sleeve forward either by hand, trip rod or tag line. When the sleeve clears the shank of the hook, the hook is rotated by pulling on the main line which rotates the hook at the eye. When the hook has reached approximately 140–160 degrees, it releases itself from the flesh of the fish. By using barbless hooks or hooks with the barb on the back side of the bend, the hooks will release quickly and freely, with the minimum possible amount of damage to the fish. Also disclosed are throat blocking sleeves which extend outward from the arcuate portion of the hook. The throat blocker sleeves imitate a spine on a fish which a larger fish would have difficulty swallowing, thereby discouraging a hooked fish from swallowing the hook. The modified hook disclosed herein increases the success rate of catch and release fishing.

18 Claims, 11 Drawing Sheets

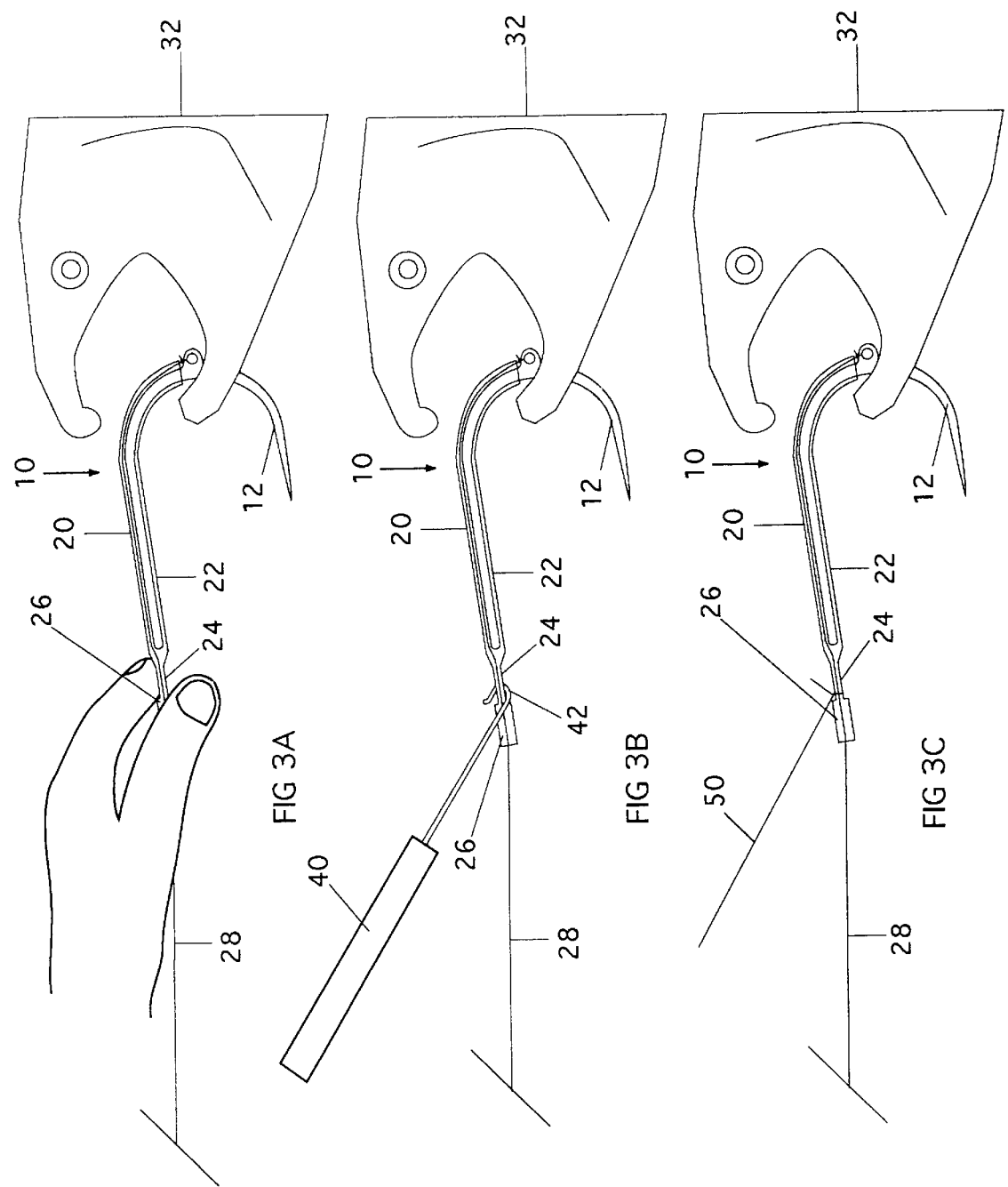

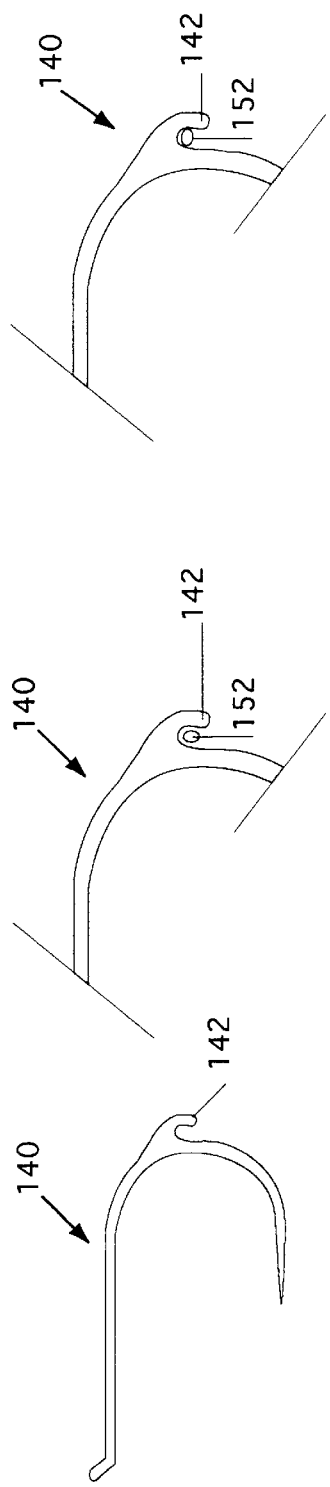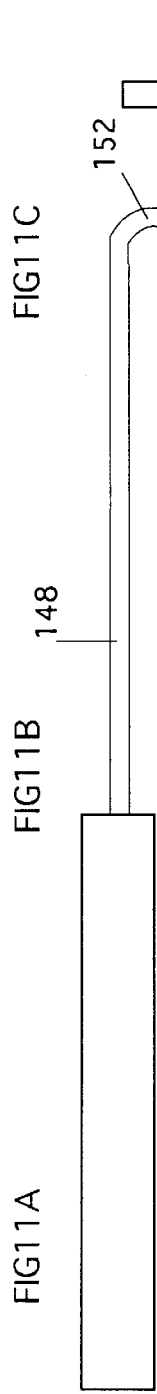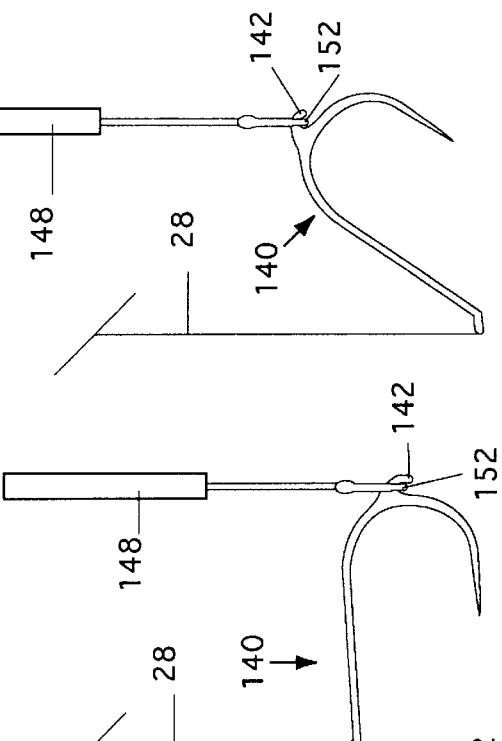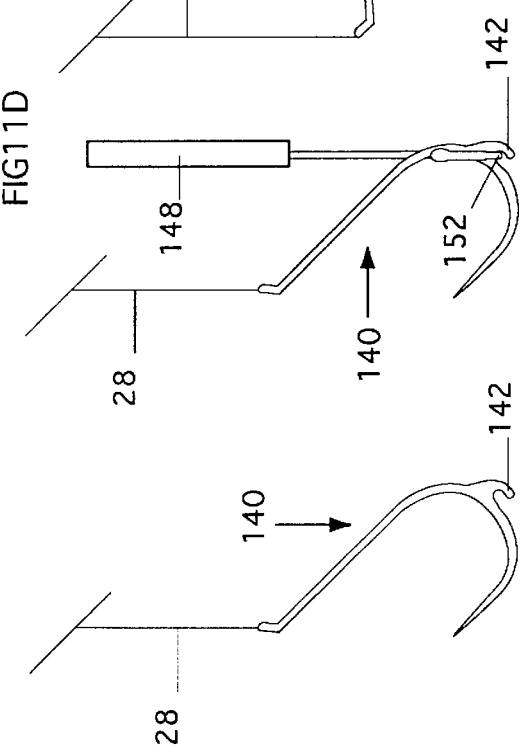

FISHING HOOK APPARATUS FOR CATCH AND RELEASE FISHING

RELATIONSHIP TO OTHER APPLICATIONS

This application claims the benefit of U.S. Provisional Application No. 60/019,045, filed May 20, 1996, which is hereby incorporated by reference in its entirety.

FIELD OF THE INVENTION

The present invention relates to an apparatus for catch and release fishing. More particularly, it relates to fishing hooks which may be easily removed from a fish and which may be configured to prevent a fish from swallowing the hook.

BACKGROUND OF THE INVENTION

The concept of fishing goes back before the beginning of recorded history, and man has continued to fish to provide food to eat and, today, as a recreational sport. As time has passed, we have developed more and more refined fishing equipment and techniques to attract and catch fish. However, as more and more fisherman are drawn to the sport, we have begun to endanger some species of fish. In order to preserve endanger species and prevent other species from becoming endangered, limits have now been imposed on fisherman as to size, type and quantity of fish they may keep. For example, due to dams, water irrigation, angling equipment and angling techniques our salmon population has suffered greatly. The spring run salmon count is at an all time low and almost to the point of declaring this run endangered. This could eliminate ocean dead-bait fishing entirely. Catch and release fishing, where a fisherman releases the fish after catching it, has become the single most important conservation tactic for the average fisherman.

However, the catch and release tactic may not actually save the fish which has been caught. A fish which has been hooked and released may very well be fatally injured. The hook removing process is particularly dangerous to the fish. During this time the fish is generally out of the water where it cannot breath; and, for a novice, the hook removing process may take long enough to endanger the life of the fish. Even more often, however, the process of removing the hook causes severe trauma to the area where the fish was hooked. Especially, if the hook was in the esophagus or dose to vital organs, the wound and associated trauma may eventually kill the fish. An additional danger is created when the fisherman is removing the hook from the fish. The removal process frequently disturbs the mucus which protects the fish from germs. When this protective coating is disturbed or removed, the fish is more likely to sicken and die. With this in mind the present invention is designed to reduce hook mortality by anglers when catching and releasing under size salmon and for trout, stripers and any fish with size limits or slot limits, etc.

A further danger, in this case to the fisherman, is damage to the hand being used to release the hook. Some fish have characteristics which may injure the fisherman. These characteristics include such things as sharp teeth, aggressiveness, sharp gill plates, and dangerous thorns, spikes or fins. These characteristics increase the chances that a fish may wound a fisherman who is trying to release a hook from the fish's flesh. Also, other animals such as sea lions may try to eat or steal the fish, which can in turn endanger the fisherman's hands.

Therefore, it is clear that there is need in the industry for a hook assembly which is easily removed from a fish while causing a minimum of damage and trauma to the fish and which also provides some protection against injury for the fisherman.

SUMMARY OF THE INVENTION

In keeping with the foregoing discussion, the objective of the present invention is to provide a hook assembly which may be easily and quickly disengaged from a fish, while minimizing any damage to the fish. Optimally, this should be done without requiring the fisherman to hold and/or manually manipulate the fish, thereby keeping the mucus of the fish generally intact and protecting the fisherman's hands from spikes, bites, etc.

Another objective of the present invention is to provide a hook configuration which discourages a fish from swallowing the hook. A fish which swallows a hook is far more likely to be fatally injured than a fish which is hooked through the lip or mouth. Therefore, preventing or reducing the chances that a fish will swallow a hook increases the likelihood that a fish may be released without permanent injury.

In keeping with these objectives, the present invention takes the form of a self releasing hook which is especially designed to work with a sliding sleeve that holds the hook in the straight position while fishing. These hooks have a straight shank. The eye of the hook is located on the outer edge of the hook at approximately the middle of the arcuate section. The hook in combination with the sliding sleeve complete the self releasing rig. After the angler catches the fish, the hook is removed by pulling the custom sleeve upward either by hand, trip rod or tag line. When the sleeve clears the shank of the hook, the hook is rotated by pulling on the main line which rotates the hook at the eye. When the hook has reached approximately 140–160 degrees, it releases itself from the flesh of the fish. By using barbless hooks or hooks with the barb on the back side of the bend, the hooks will release quickly and freely, with the minimum possible amount of damage to the fish.

The design of the self releasing hook with its ease of releasing will help prevent excessive handling in removing hooks of all types and configurations including lures and jigs. In the San Francisco region, the party boats have a serious problem with sea lions following their boats, and then taking most of the salmon when hooked by sportsmen before the salmon can be landed. In some cases, the deck hands risk personal injury in trying to release salmon when the sea lions are attacking the salmon. The releasing hook will allow the user to release the hook from a slight distance and alleviate some of this hazard.

Another problem is preventing the fish from swallowing the hook. Some biologist believe that any gut caught fish is a dead fish. The heart and other vital areas of the fish lie around the throat and it would be difficult to not damage these critical organs on a gut hookup. Bleeding and tearing of these vital organs kills the fish. The solution to this problem comes in the form of a throat blocker. The throat blocker simulates the thorny spine on a undesirable fish. The throat blockers are designed to prevent the fish from swallowing the dead bait hooks, thereby not hooking up in the throat or gills. Instead the throat blocker encourages jaw hookups which give the best chance of survival. Other objects and advantages of the invention will no doubt occur to those skilled in the art upon reading and understanding the following detailed description along with the accompanying drawings.

BRIEF DESCRIPTION OF THE DRAWINGS

FIG. 3A shows the manual release method used with the self releasing hook.

FIG. 3B shows the trip rod release method used with the self releasing hook.

FIG. 3C shows the tag line release method used with the self releasing hook.

FIGS. 11A–H show an alternate embodiment of the self releasing hook with an alternate releasing tool.

DETAILED DESCRIPTION OF THE INVENTION

Throughout the drawings, the sleeve has been shown as transparent to provide the clearest understanding of the present invention. In fact, the sleeve may or may not be transparent, depending on the material used to form the sleeve.

Figure 1A:
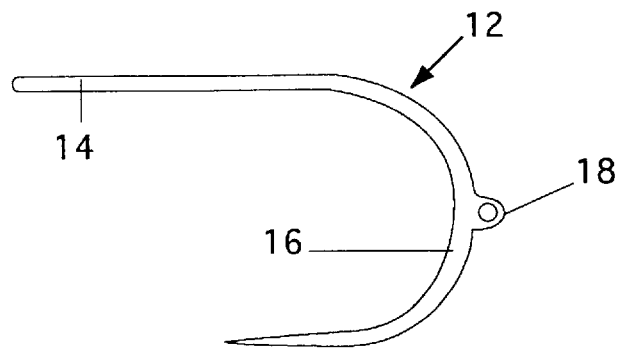
FIG. 1A is a side view of the hook portion of the self releasing hook.
Figure 1B:
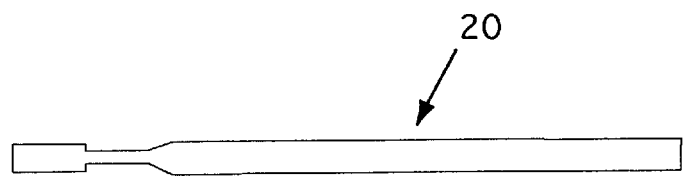
FIGS. 1B and C are side views of the flexible sleeve portion of the self releasing hook.
Figure 1C:
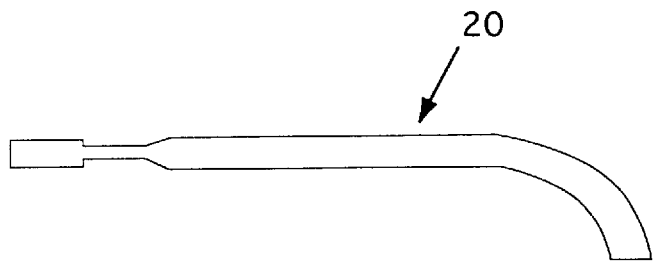
FIG. 1D is a side view of the self releasing hook assembly.
Figure 1D:
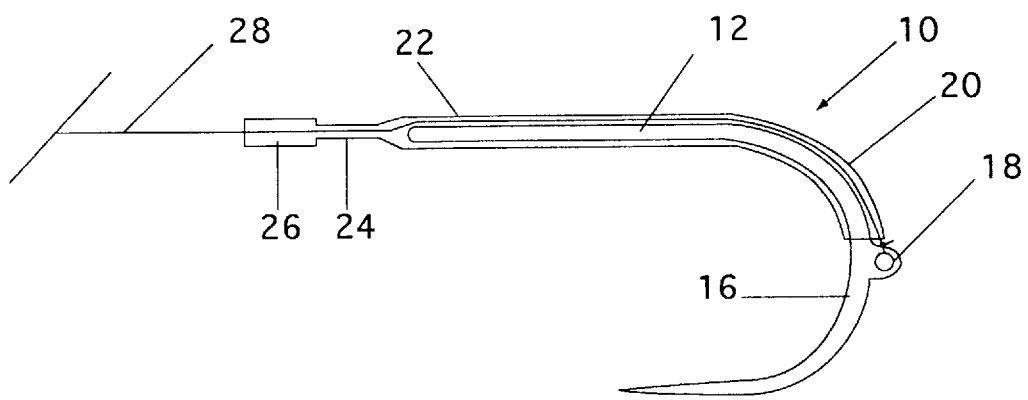

FIG. 1A is a side view of the self releasing hook 12. FIGS. 1B and 1C are side views of the flexible release sleeve 20. FIG. 1D is a side view of the self releasing hook assembly 10. As seen in FIGS. 1A and 1D, the hook 12 has a straight shank 14 and the eye 18 of the hook 12 is located on the outer edge of the hook 12 at approximately the middle of the arcuate section 16. For optimal operation this should put the eye 18 of the present invention in line with the plane of an eye of a standard hook. The sleeve 20 is preferably made from any durable flexible material such as plastic, poly tubing, and polymeric tubing, but may also be formed of other materials such as metal. The sleeve 20 slidably conforms to the hook shank 14 while allowing a fishing line 28 to run through. Above the top of the shank covering portion 22 of the sleeve 20, the sleeve 20 reduces to a smaller diameter which is closer to the fishing line 28 size. Above the narrowed portion 24 of the sleeve 20, or neck 24, is a wider section which forms a head 26 which may be easily grasped. The sleeve 20 performs a number of functions, it holds the hook 12, releases the hook 12 and protects the fishing line 28. The head 26 of the releasing sleeve 20 is larger in size than the neck 24 of the sleeve 20 to allow for hooking by a trip rod (detailed in FIGS. 4A–D). The sleeve 20 makes the rig very strong and the hook 12 can withstand a tremendous pressure under use. For use in salmon mooching the sleeve length is approximately 3" long, and for use in conventional fishing the sleeve 20 is generally slightly longer than the shank 14 of the hook 12 to allow engagement by the trip rod. The design of the hook 12 makes the hook 12 very strong because it removes the pressure from the shank 14 of the hook 12. The eye 18 of the hook 12 serves to hold the fishing line 28 as well as keep the hook 12 from penetrating too deeply in the fish. The sleeve 20 keeps the fish teeth from cutting or damaging the fishing line 28, thereby reducing the risk of fish swallowing a hook 12 which has been bitten from its line 28 or from having its throat blocked off by a bitten off hook 12. Both of these situations are likely to result in severe injury and/or death for the fish.

In an alternate embodiment, the eye is attached to the hook with a small leg. This leg may be used to have the eye project slightly away from the hook. This acts as a stop to prevent the eye from entering the tear where the hook enters the flesh of the fish and further assures that the hook does not dig in too deeply. In most cases this is not a problem because, even without the leg, the configuration of the hook does not encourage deep penetration of the hook. However, this embodiment further discourages excessive penetration of the hook.

Figure 2A:
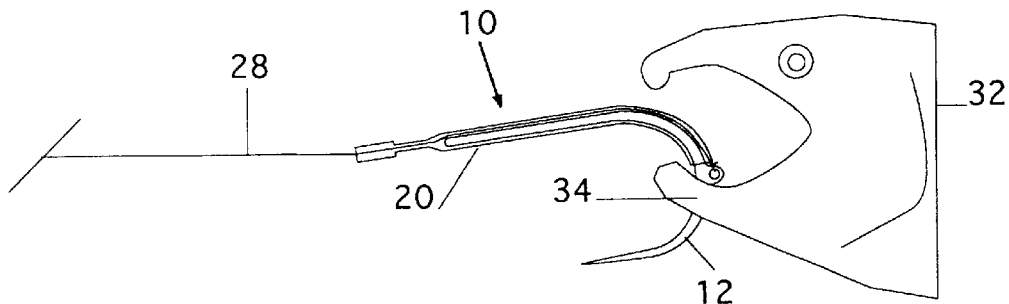
FIGS. 2A–D show the releasing sequence used with the self releasing hook.
Figure 2B:
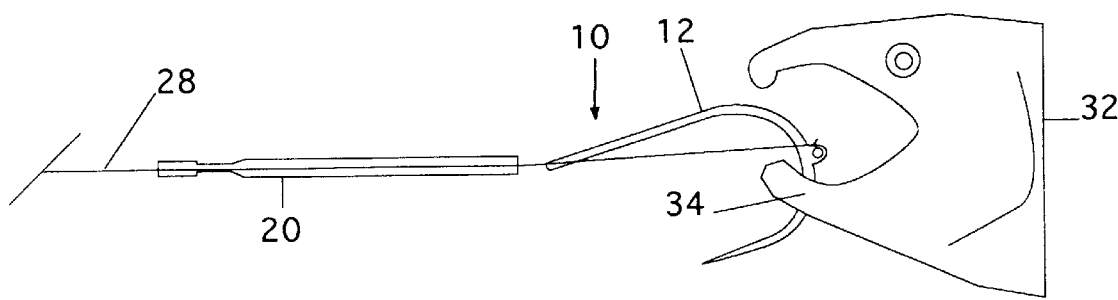
Figure 2C:
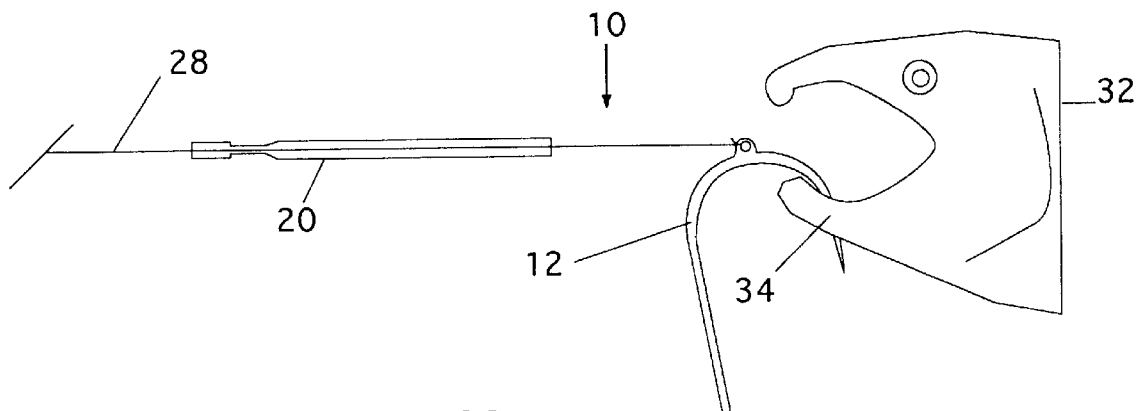
Figure 2D:
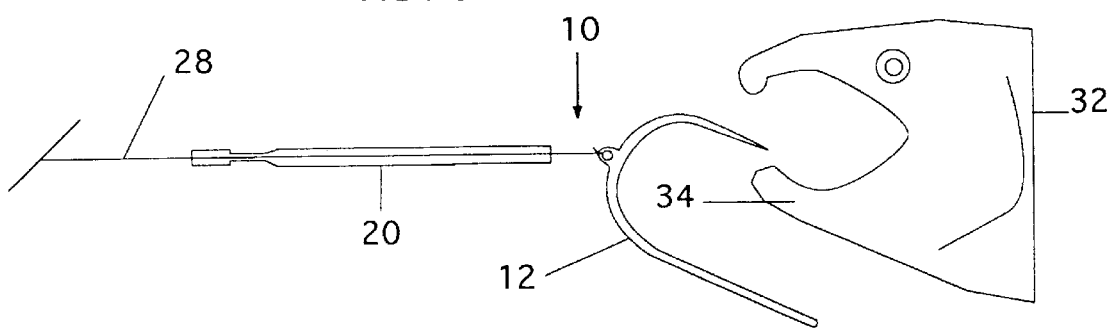
Figure 4A:
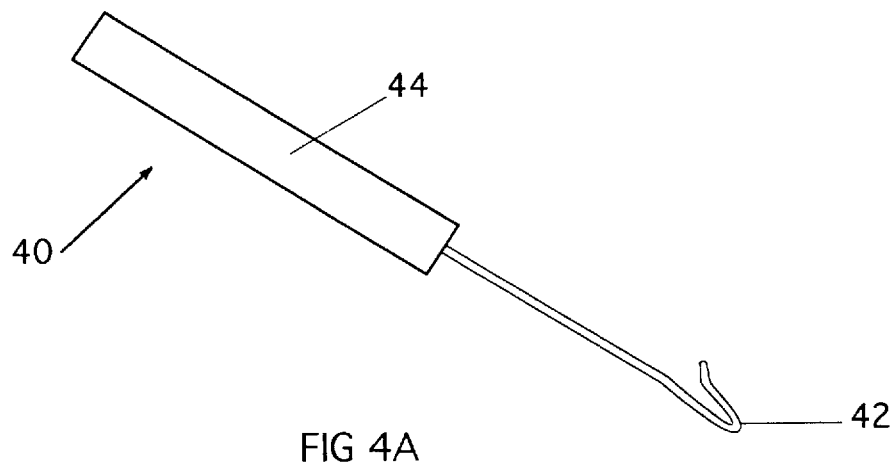
FIGS. 4A–D show the trip rod for actuating the self releasing hook.
Figure 4B:
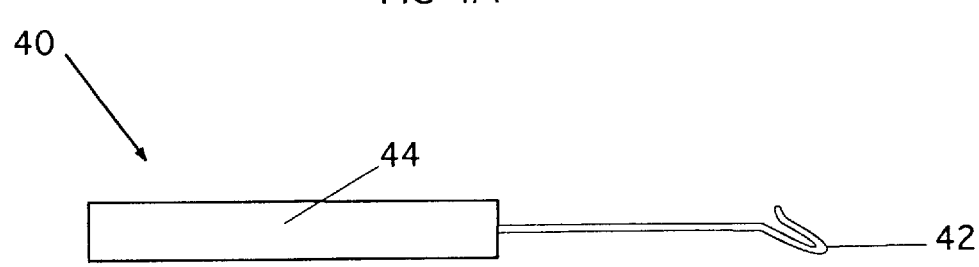
Figure 4C:
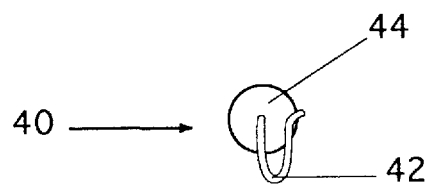
Figure 4D:
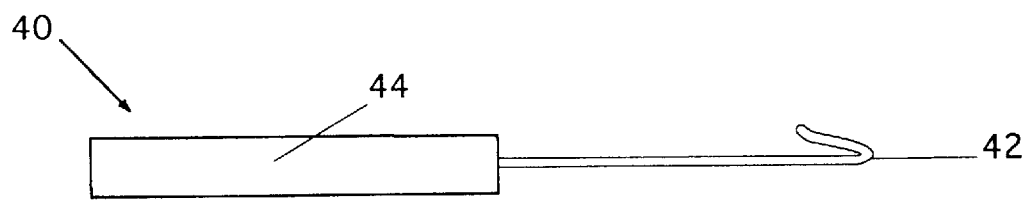

FIGS. 2A–D are side views of the release sequence of a fish 32 caught with the self releasing hook 10. In FIG. 2A, the self releasing hook 10 is shown hooking a fish 32 through the lower lip 34. In FIG. 2B, the flexible sleeve 20 has been pulled back and has completely disengaged the hook 12. From this point, tension on the fishing line 28 causes the hook 12 to rotate out of the flesh of the fish 32. In FIG. 2C, the hook 12 has rotated most of the way out of the lip 34 of the fish 32. FIG. 2D shows the hook 12 fully disengaged from the lip 34 of the fish 32, thereby allowing the fish 32 to swim away with no permanent damage.

FIGS. 3A–C are side views of 3 methods for tripping the flexible sleeve 20 to release the hook 12 and allow the hook 12 to retract from the flesh of the fish 32. FIG. 3A is side view of a self releasing hook 10 being released by hand. In this method, the user gently grasps the trip head 26 of the flexible sleeve 20 and pulls steadily upward until the shank covering portion 22 of the sleeve 20 is completely clear of the hook 12. FIG. 3B is a side view of the flexible sleeve 20 being released with a trip rod 40. The trip rod 40 has a hook 42 which slips around the neck portion 24 of the sleeve 20 and engages the base of the trip head 26 so that the sleeve 20 may be pulled from the hook 12. FIG. 3C is a side view of the sleeve 20 releasing the hook 12 by using a tag line 50. The tag line 50 is a separate line which is tied just below the trip head 26 around the neck 24 of the sleeve 20. When the user wishes to release the fish 32, the user grasps the end of the tag line 50 and pulls, thereby pulling the sleeve 20 and releasing the hook 12.

FIGS. 4A–D are perspective, side, end, and top views, respectively, of the tripping rod or tripping tool 40 which is used with the self releasing hook 10. The tripping tool 40 has a wire trip end formed into a U 42 which is made from a durable strong material such as metal and inserts in a handle 44, which may be made of any relatively durable material such as wood, plastic, metal, etc. For example the entire tool 40 may be made of metal. The U-shaped portion 42 of the trip rod 40 slopes downward slightly as a line guide which allows the user to slide the tool 40 down the fishing line 28 to accurately and quickly find and grab the sleeve 20. The U-shaped end 42 of the tool 40 allows the tool 40 to grab the head 26 of the sleeve 20 for moving the sleeve 20 and releasing the hook 12. The U 42 may vary in size and length depending on the size and thickness of the sleeve 20. A typical size for the U 42 is about ¼ inch in length (the length of each of the legs of the U 42) and has a radius to fit the sleeve 20, in the embodiment shown, about ⅛ inch. Just above the U-shaped portion 42 there is a bend so that the U 42 is at an angle to the rest of the tool 40 providing a comfortable grip angle during use.

Figure 5A:
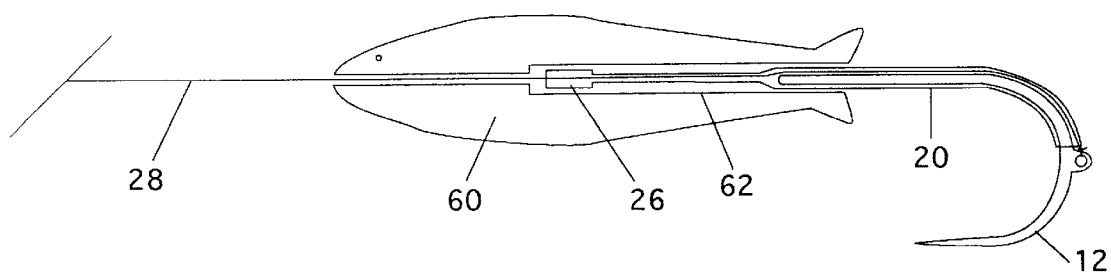
FIGS. 5A–C show the self releasing hook used with a jig or lure.
Figure 5B:
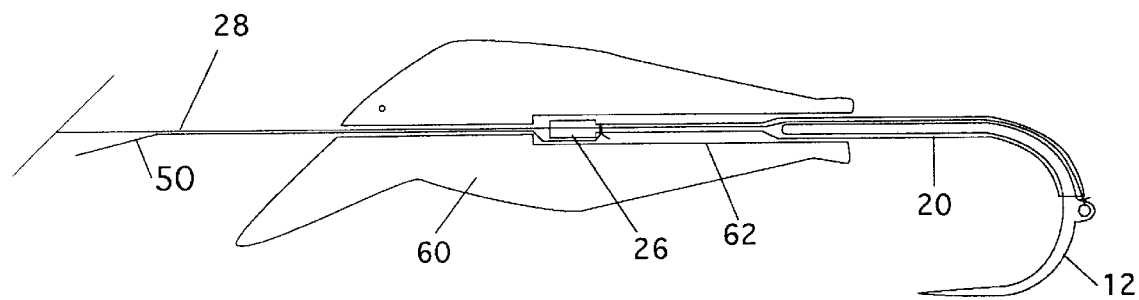
Figure 5C:
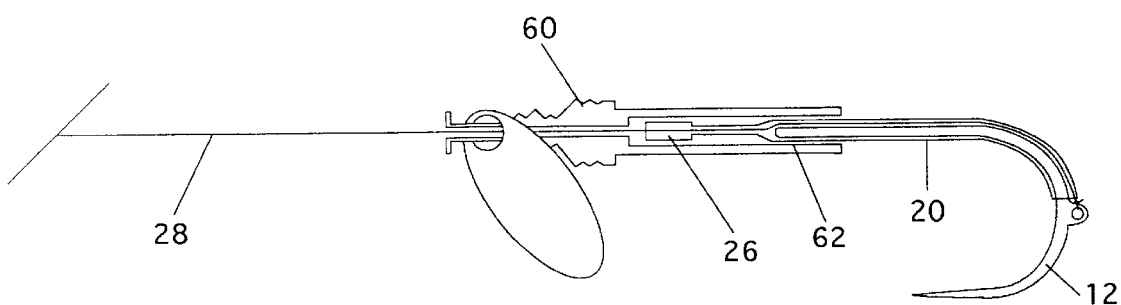

FIGS. 5A–C are side views of a new type of jig, lure, and spinner 60 with a hollow channels 62 running through the jig, lure, or spinner 60 to conform to a reasonably loose fit for the sleeve 20 and line 28 and using a self releasing hook 12. If used with the tag line 50 release method, the tag line 50 may be run up the channel 62 in the lure 60, as shown in FIG. 5B, thereby allowing the user to easily grasp the tag line 50 and pull the sleeve 20 and lure 60 off of the hook 12. If the trip rod 40 or manual methods are used, the jig, lure, or spinner 60 is pulled up and out of the way prior to grasping or engaging the trip head 26.

The invention has an additional advantage, since the jig, lure, or spinner 60 has a hollow channel 62 which forms a reasonably loose fit over the sleeve 20 and line 28, upon a fish shaking its head to throw the hook 12, the jig 60 slides up the line 28. This helps prevent the hook 12 being thrown by decreasing the amount of weight attached to the hook 12, as well as decrease the chances of the fish injuring itself.

Figure 6:
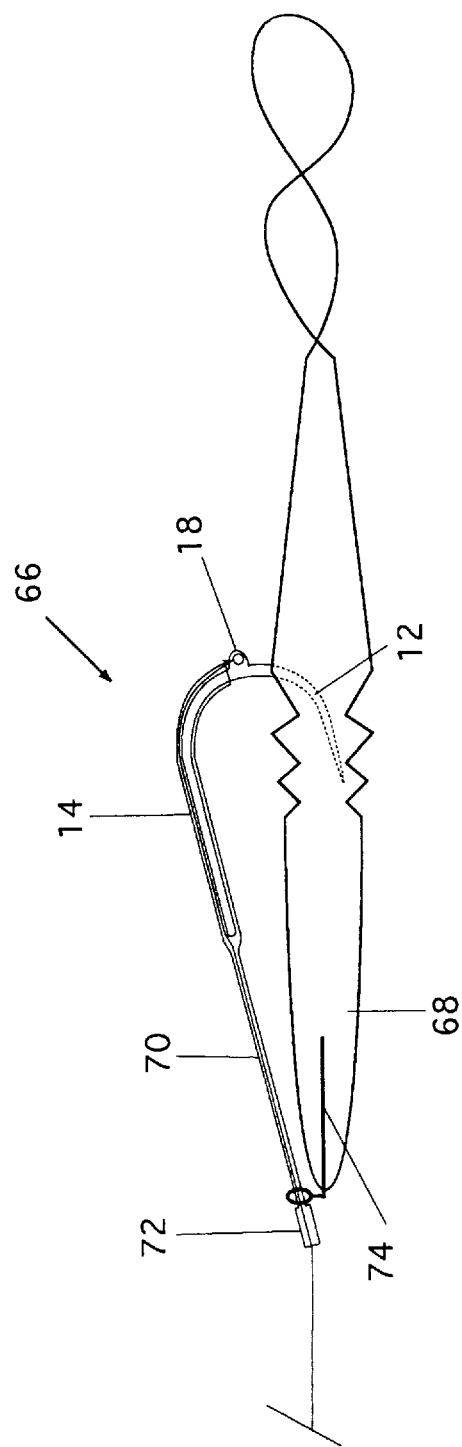
FIG. 6 is a side view of the self releasing hook configured to hold a worm rig in place.

FIG. 6 is a side view of an alternate embodiment of the present invention, a self releasing worm hook 66. In this case, a worm 68 is used with the self releasing hook 66. The head 72 of the release sleeve 70 holds a pin 74 that sticks into the rubber worm 68 for alignment and to hold the worm 68 in place.

Figure 7A:
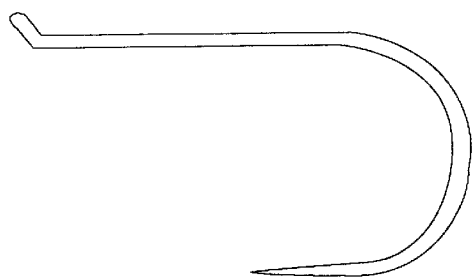
FIG. 7A is a side view of a conventional hook.
Figure 7B:
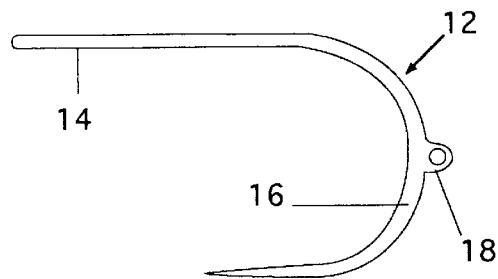
FIGS. 7B–7F show alternate configurations of the hook portion of the self releasing hook.
Figure 7C:
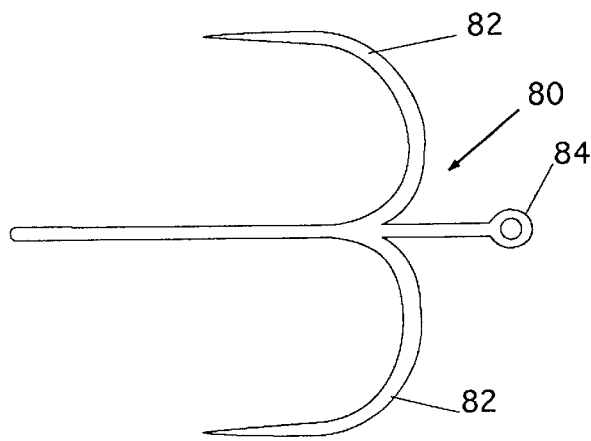
Figure 7D:
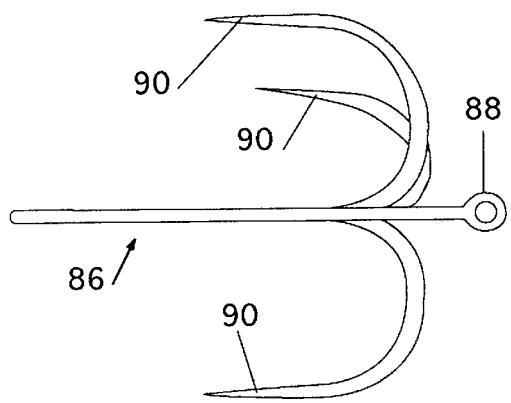
Figure 7E:
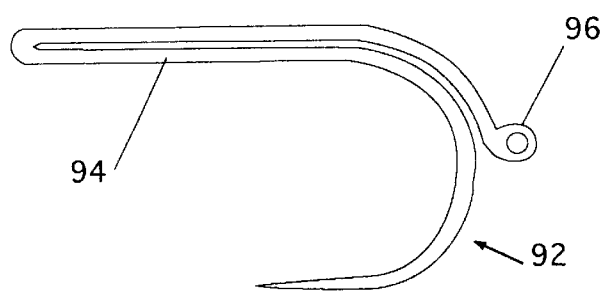
Figure 7F:
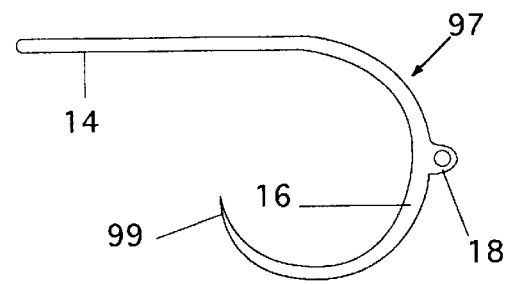

FIG. 7A is a side view of a standard barbless hook currently used in salmon fishing. FIGS. 7B–F are side views of different hook designs that can be used with the releasing sleeve 20. FIGS. 7B and 7F are a side views of hook styles designed to work with the release sleeve. Each hook 12 has a straight shank 14. The eye 18 is located at the bottom of the bend 16 of the hook 12 approximately in the middle. FIG. 7B shows a straight tip hook and FIG. 7F shows a circle tip hook 97 with the tip 99 rounded inward. Both of these versions of the hook 12 may be stamped out of metal. FIGS. 7C is a side view of a double hook 80 for self releasing. This has two hooks 82 and an eye 84, all of which are coplanar. The eye 84 is located on the base of a projection which extends downward in between the hooks 82 which allows the hook 80 to disengage regardless of how the fish is hooked. FIG. 7D is a side view of a treble hook 86 that has been modified for self releasing. An eye 88 has been added on with a projection which extends downward from the center of the three hooks 90. This allows the hook 86 to release no matter which of the hook(s) 90 have hooked into the fish. The double hook 80 design is preferred over the treble 86 design because it is virtually impossible to tangle the line 28 so that the hook 80 cannot release. FIG. 7E is a side view of a standard hook 92 with a very long shank 94. The shank 94 has been double over 180 degrees and the eye 96 laid back over the bend in the hook 92 and soldered in place.

Figure 8A:
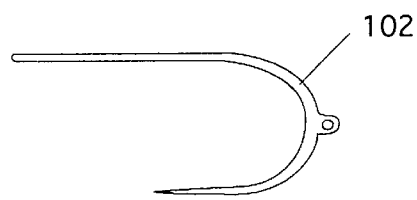
FIGS. 8A–G are side and top views of the self releasing hook used with flies, streamers, and nymphs.
Figure 8B:
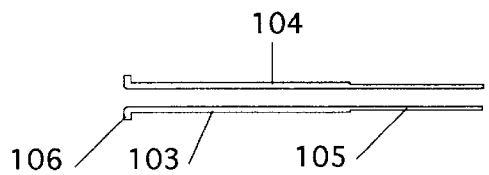
Figure 8C:
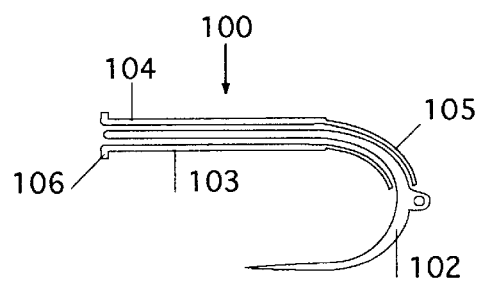
Figure 8D:
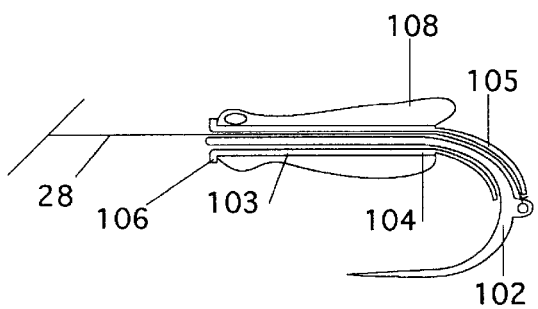
Figure 8E:
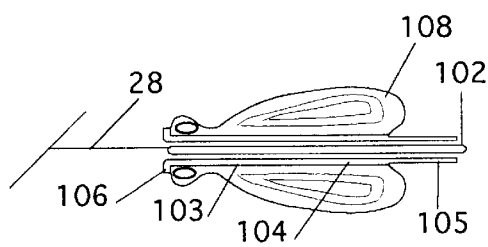
Figure 8F:
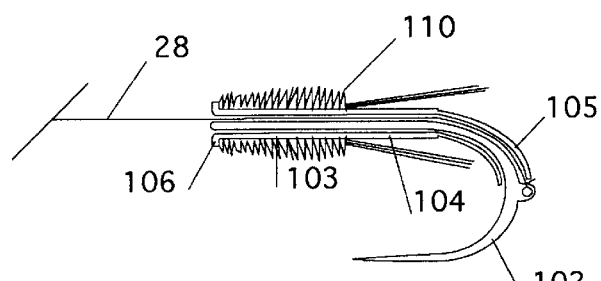
Figure 8G:
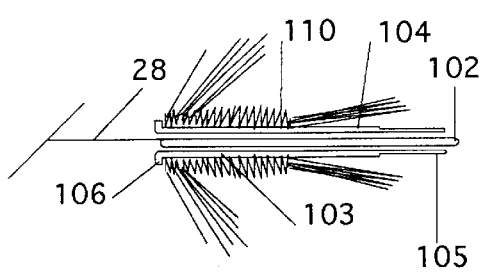

FIGS. 8A–G are views of self releasing hooks 100 which are used with flies 108 for fly fishing. FIG. 8A is the hook 102, FIG. 8B is the sleeve 104, and 8C is a side view of the sleeve 104 over the hook 102 in its assembled position. In this embodiment, the internal diameter of the sleeve 104 is constant. The external diameter of the sleeve 104 is also constant except for the head 106 which is slightly larger than the rest of the sleeve 104 and, optionally, the tip portion which tapers down to make the tip more flexible than the body. FIGS. 8D and 8E are top and side cross-sectional views of a body of a fly 108 tied to the releasing sleeve 104. The sleeve 104 could be made from a metal or other stiff material designed to resist crushing under the tension of tying the body. The sleeve 104 may also be formed of other materials if the fly 108 is not tied so tightly as to interfere with movement of the sleeve 104 over the hook 102 and line 28. FIGS. 8F and 8G are side and top cross-sectional views of a streamer or nymph 110 attached to the exterior of the sleeve 104. The present embodiment may user several types of sleeves 104 which range from flexible to rigid. If the shank portion 103 of the sleeve 104 is made of a rigid material, the tip section 105 of the sleeve 104 is still made of a material which is at least somewhat flexible, so that the tip portion 105 can move between the arcuate position around the bend of the hook 102 and the straight shank. Alternately, the whole sleeve 104 may be formed of a semi-flexible material which would provide support for the fly 108, but would still allow the sleeve 104 to change shape to conform to the hook 102 while in use. The sleeve version shown has the shank portion 103 relatively thick and rigid, and the tip section 105 tapered down and more flexible. Other flies and modifications may also be attached to the exterior of the sleeve 104.

The self releasing hooks 10, 100 can be used in many configurations such as with both live and dead baits like an anchovy or herring. It can be used with lures, spinners, jigs, plugs and worm hooks with bass. They can be rigged in a double hook configuration for salmon. The small version can be used for fishing with floating baits and can be used for flies in fly fishing. The fly is tied to the sleeve, and in combination with the special hook, makes the fly. This configuration allows you to change to a larger hook length while using the same fly body. Unlimited combinations of configurations could be used. Existing lures can be transformed into a self releasing rig by having their hooks removed, running the line through the eye of the lure and placing a bead in front of the self releasing hook to keep it from sliding back. Specially designed jigs and lures with a hollow tube can allow for the self releasing sleeve to slide securely into the lure and will allow the lure to be thrown up the line upon hookup, thereby not allowing the weight of the lure to throw the hook.

An alternate configuration of the present invention has a double self releasing hook rig used for salmon. In this setup there are two hooks, the first hook is in the head of the bait fish and the second is in the tail. The main fishing line runs from the pole through the sleeve of the first hook and is tied to the eye at the base of the hook. A second line, which is about 3 to 4 inches long and remains slack until hookup, is tied to the first eye and runs through the second sleeve to the second eye. This line may be a continuation of the main line, but a second line is preferred in order to not interfere with the flipping action of the first hook. A third line is tied to the first hook, runs through the second sleeve and the end is left loose. Running through the second sleeve provides enough tension that the bait can be arched for proper spin which will attract salmon.

Figure 9A:
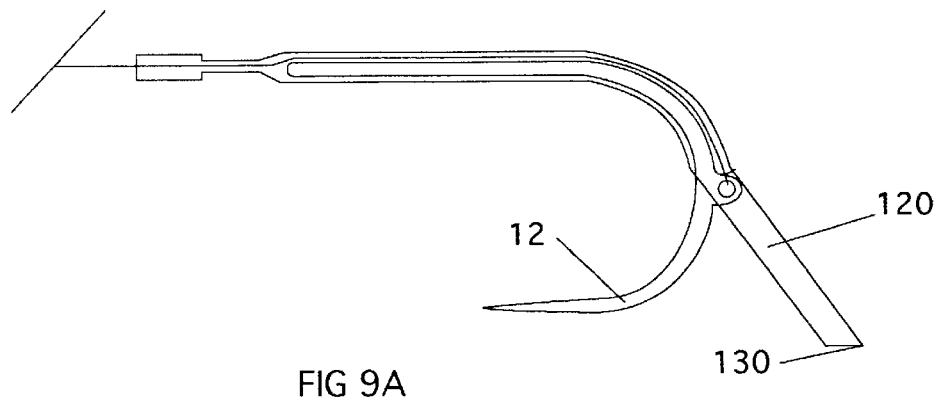
FIG. 9A is a side view of a self releasing hook used with a built-in throat blocker sleeve.
Figure 9B:
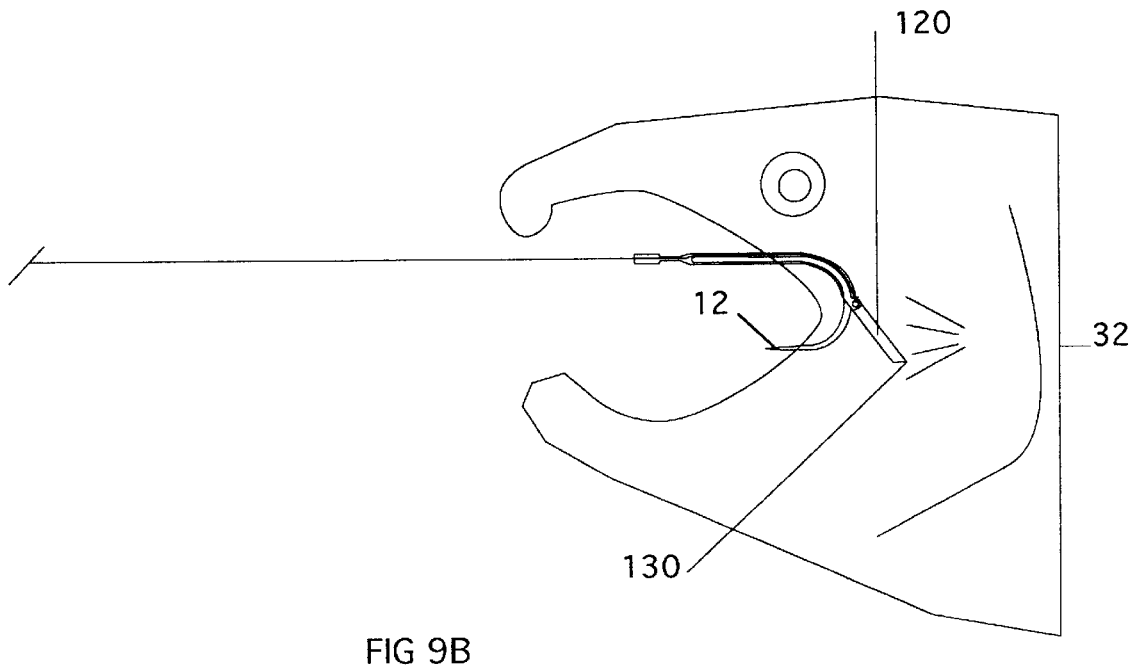
FIG. 9B shows the self releasing hook with the built-in throat blocker sleeve blocking the fish from swallowing the hook.

FIGS. 9A–B and 10A–B are side views of throat blockers 120, 122, 124. FIG. 9A is a side view of the self releasing hook 12 with a built-in throat blocker 120. The throat blocker 120 is designed to prevent the salmon from swallowing the hook 12 but still allowing easy jaw hookups and shown in FIG. 9B.

Figure 10A:
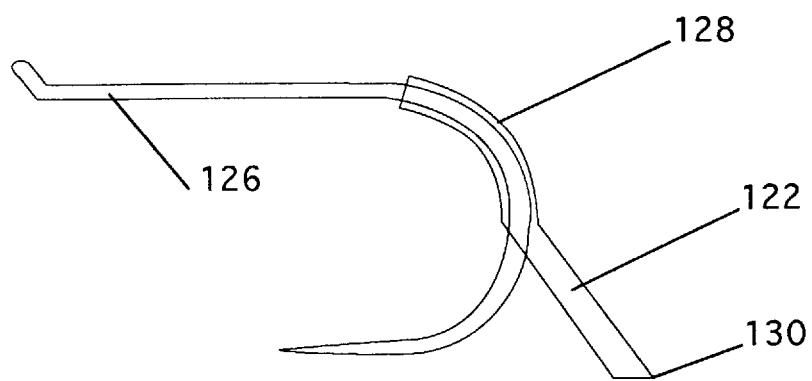
FIG. 10A shows an adjustable angle throat blocker sleeve used with a convention hook.
Figure 10B:
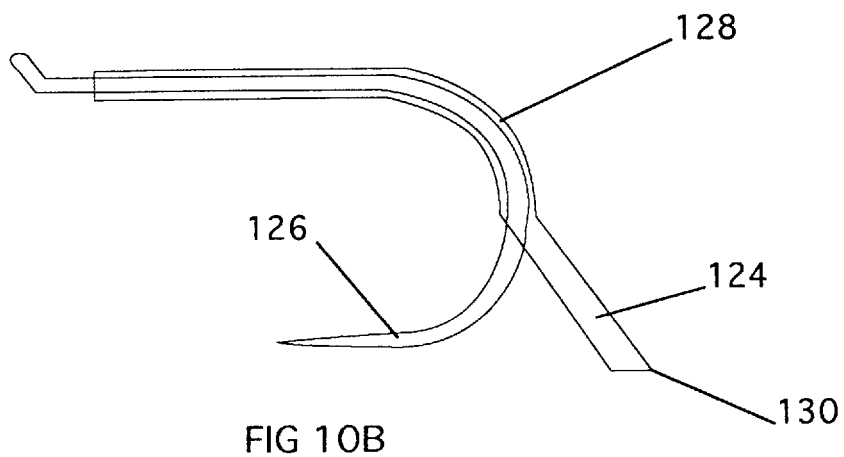
FIG. 10B is a full-shank, non-adjustable throat blocker sleeve used with a conventional hook.

FIG. 10A shows an adjustable throat blocker 122 design to be used with a standard hook 126. In this embodiment, the angler can adjust the angle and amount the throat blocker 122 will protrude and thereby adjusting the likelihood of hook penetration in the throat of the fish. FIG. 10B shows an embodiment of the throat blocker 124 which has a sleeve 128 which extends up the full length of the shank of the hook 126 so the angler can't adjust the throat blocker 124.

The principle behind the operation of the throat blocker 120, 122, 124 begins when a fish is young. Fish swallow smaller fish for food. Early in life they learn which fish are safe to swallow and how to swallow them. They also learn to spit out anything that does not go down their throat properly. This built in reaction training is honed to perfection by thousands of swallowings. This is what makes the throat blockers 120, 122, 124 work. The non-penetrating spine 130 on the throat blocker 120, 122, 124 causes the dead bait to tilt and block the salmon's ability to line up the bait and swallow just like a spine on the back of an undesirable fish. When the salmon lines the fish up for swallowing, the spine 130 will jab at the salmon's throat. This confuses the salmon into thinking that they may have made a mistake and swallowed the wrong kind of fish. While the salmon ponders whether to swallow or spit the dead bait out, the angler detects the bite and sets the hook. By the design of the throat blocker 120, 122, 124, the hook is pushed away from the throat and gill area by the protruding spine 130 but allows proper alignment for setting the hook in the fish jaw on the hook set.

The throat blocker 120, 122, 124 is a sleeve 128 of durable flexible material like plastic, poly tubing, polymeric tubing, coil spring or flexible non-penetrating metal. If plastic or polymeric material is used, the sleeve 128 is slid over the hook body. If metal is used, it can be soldered or welded to the hook body. For the coil spring, several of the coils of the spring would be wrapped around the hook and the remaining portion of the spring would angle out from the hook to form the spine 130. They can be made in conjunction with the self releasing sleeve as well as in fixed and adjustable configurations to fit standard hooks. In use with standard hooks the fixed version would be tamper proof. The adjustable version would allow anglers to adjust it to their satisfaction. The design of the spine 130 would not be in the way when a hook set pulls the hook towards the mouth opening, allowing the point of the hook to penetrate the jaw, but keeps the hook from catching the throat or gills. The jaw hook up is less harmful to the fish when releasing. An added benefit from the throat blocker 120, 122, 124 is that the throat blocker 120, 122, 124 may be made of a hollow material that can be filled with a fish attractant such as fish oil. Throat blockers 120, 122, 124 may also be used with double or treble hooks, in which case one or two of the hooks of each double or treble is equipped with adjustable or fixed throat blockers.

FIGS. 11A–11H are side views of an alternate type of trip release hook 140 with a mechanically operated tripping rod 148. FIG. 11A is a side view of the hook 140. The hook 140 has a curved trip release hook 142 attached to the bottom of the bend in the hook 140. The trip release hook 140 is designed to fit in the wire tip 150 of a manual tripping rod 148. FIG. 11B is a side view showing the trip rod 148 engaging the trip release hook 142 on hook body 140. FIG. 11C is a side view showing the manual trip rod 148 engaging the trip release hook 142 on hook body 140 after the hook 140 is flipped. The base of the U 152 of the trip rod 148 has a deformed cross-section. This section 152 is oval or oblong. As the hook 140 begins to flip, this elongated section 152 of the trip rod 148 has locked into the trip release hook 142.

FIG. 11D is a side view of the trip rod 148 showing the U shape designed to interlock with the trip release hook 142 on the hook body 140. The curved portion of the trip rod 140 is flattened into an elongation 152 to fit the arch of the curved hook 142 at the base of the hook 140. When engaged, the wire of the trip rod 148 will not flip out because, as the hook 140 turns, the elongated section 152 is locked in the trip release hook 140 because of its elongation. FIGS. 11E–11H are side views showing the flipping sequence used in flipping the hook 140 out of the fish. The hook 140 is flipped by placing the tripping rod 148 over the trip release hook 142 at the base of the hook 140 and pulling. When the trip rod 148 is pulled, thereby pulling the trip release hook 142, the hook 140 flips and releases from the fish.

With angler acceptance and proper instruction the combination self releasing hook 10, 100 and throat blocker 120, 122, 124 will help alleviate the problem of fish hooking mortality, thereby preserving the fish population for years and fisherman to come.

Although the examples given include many specificities, they are intended as illustrative of only one possible embodiment of the invention. Other embodiments and modifications will, no doubt, occur to those skilled in the art. For example, other sizes and styles of hook may be fitted with sleeves, or the sleeves may be extended farther to also easier access to the head of the sleeve. Thus, the examples given should only be interpreted as illustrations of some of the preferred embodiments of the invention, and the full scope of the invention should be determined by the appended claims and their legal equivalents.

I claim:

1. In combination:

a fishing line and a fishing apparatus, comprising:

a fishing hook having a shank portion and an arcuate portion, an eye located on said arcuate portion of said fishing hook, said fishing line being attached to said eye, and a sleeve configured to cover at least part of said arcuate portion of said fishing hook and the fishing line extending from the eye.

2. The fishing apparatus of claim 1 wherein said sleeve is formed of a flexible, generally tubular material.

3. The fishing apparatus of claim 1 further comprising a head located on a proximal portion of said sleeve.

4. The fishing apparatus of claim 3 in combination with a tripping rod having a tripping hook configured to engage said head of said sleeve.

5. The fishing apparatus of claim 1 further comprising a tag line attached to said sleeve.

6. A fishing apparatus, comprising:

a fishing hook having a shank portion and an arcuate portion, and a sleeve configured to cover at least part of said arcuate portion of said fishing hook, wherein said sleeve further comprises a flexible projection depending from a distal portion of said sleeve, said projection extending outward from said fishing hook, thereby decreasing the likelihood of a fish swallowing said fishing hook.

7. The fishing apparatus of claim 6 further comprising an eye, said eye located on said arcuate portion of said fishing hook.

8. The fishing hook apparatus of claim 6 further comprising an eye located on said arcuate portion of said fishing hook.

9. A fishing hook apparatus, comprising:
   a fishing hook having a shank portion and an arcuate portion,
   an eye located on said arcuate portion of said fishing hook,
   and a flexible sleeve having a proximal end and a distal end, said distal end of said sleeve configured to cover at least part of said shank portion of said fishing hook, wherein said flexible sleeve has a first exterior diameter at said proximal end, a second exterior diameter at said distal end, and a third exterior diameter intermediate said proximal end and said distal end, wherein said third exterior diameter is smaller than said first exterior diameter.

10. The fishing hook apparatus of claim 9 wherein said third exterior diameter is smaller than said second exterior diameter.

11. The fishing hook apparatus of claim 9 further comprising a tag line attached proximate to said proximal end of said flexible sleeve.

12. The fishing apparatus of claim 9 used in combination with a tripping rod having a tripping hook configured to engage a head on a proximal portion of said sleeve.

13. A method of catch and release fishing, comprising the steps of:
   (a) attaching a fishing line to an eye on an arcuate portion of a hook;
   (b) placing a sleeve over at least part of the arcuate portion and a shank of said hook and the fishing line extending from the eye on the arcuate portion;
   (c) catching a fish on said hook;
   (d) deciding to release the fish;
   (e) pulling said sleeve off of said hook, thereby allowing said hook to rotate around said eye of said hook;
   (f) and allowing said hook to rotate completely out of the flesh of the fish, thereby releasing the fish.

14. The method of claim 13 further comprising the step of:
   (e) pulling on a fishing line attached to said hook, thereby causing said hook to rotate.

15. The method of claim 13 wherein step (c) is performed by pulling on a tag line which is attached to said sleeve.

16. The method of claim 13 wherein step (c) is performed by hooking a tripping tool around a head portion of said sleeve and pulling on said tripping tool to pull said sleeve off of said hook.

17. The method of claim 13 wherein step (c) is performed by manually grasping a head portion of said sleeve and pulling upward until said sleeve is off of said hook.

18. A fishing hook apparatus, consisting of:
   a fishing hook having a shank portion and an arcuate portion,
   an eye located on said arcuate portion of said fishing hook,
   and a flexible sleeve having a proximal end and a distal end, said distal end of said sleeve configured to cover at least part of said shank portion and said arcuate portion of said fishing hook.

* * * * *